(12) United States Patent
Faccin et al.

(10) Patent No.: US 7,213,144 B2
(45) Date of Patent: May 1, 2007

(54) EFFICIENT SECURITY ASSOCIATION ESTABLISHMENT NEGOTIATION TECHNIQUE

(75) Inventors: Stefano Faccin, Dallas, TX (US); Franck Le, Irving, TX (US)

(73) Assignee: Nokia Corporation, Espoo (FI)

( * ) Notice: Subject to any disclaimer, the term of this patent is extended or adjusted under 35 U.S.C. 154(b) by 881 days.

(21) Appl. No.: 09/923,966

(22) Filed: Aug. 8, 2001

(65) Prior Publication Data

US 2003/0033518 A1 Feb. 13, 2003

(51) Int. Cl.
*H04L 9/00* (2006.01)
*G06F 17/00* (2006.01)
*G06F 15/173* (2006.01)
*H04K 1/00* (2006.01)
*H04M 1/66* (2006.01)

(52) U.S. Cl. .................. 713/153; 726/14; 380/247; 455/410; 709/225

(58) Field of Classification Search ................ 713/153, 713/201, 168; 455/410, 411, 422.1, 432.1, 455/436; 709/218–219, 227, 225; 726/2, 726/11, 14; 380/247, 270, 255
See application file for complete search history.

(56) References Cited

U.S. PATENT DOCUMENTS

| | | | |
|---|---|---|---|
| 5,091,942 A | * | 2/1992 | Dent .......................... 380/46 |
| 5,596,641 A | * | 1/1997 | Ohashi et al. .............. 380/248 |
| 5,600,708 A | | 2/1997 | Meche et al. |
| 5,668,875 A | * | 9/1997 | Brown et al. ............... 380/248 |
| 5,956,331 A | | 9/1999 | Rautiola et al. |

(Continued)

FOREIGN PATENT DOCUMENTS

CA WO 01/26322 A2 * 4/2001

OTHER PUBLICATIONS

"Authentication, Authorization, and Accounting: Protocol Evaluation", By D. Mitton, et al. Jan. 2000.

(Continued)

*Primary Examiner*—Emmanuel L. Moise
*Assistant Examiner*—Minh Dieu Nguyen
(74) *Attorney, Agent, or Firm*—Squire, Sanders & Dempsey L.L.P.

(57) ABSTRACT

A Security Association establishment negotiation technique includes forwarding identifying information from a Mobile Node via a first interface to a first network element. Negotiations are then initiated between the first network element and a second network element serving as a proxy for the Mobile Node via a second interface to establish a Security Association between the Mobile Node and the first network element, the second network element utilizing previously stored Security Association parameters of the Mobile Node. Upon agreement between the first network element and the second network element with regard to the Security Association parameters, the first network element forwards the agreed-upon Security Association parameters to the Mobile Node via the first interface. The first network element may include a Home Agent, a Correspondent Node or a Agent, and the first interface may include a wireless interface to forward information between the Mobile Node and the first network element. The first network element may also include a first gateway connected to it. The first gateway may include a AAA (Authentication, Authorization, and Accounting) server. The second network element may include a second gateway and an Subscriber database/Authentication Center, and the second gateway may be connected to the Subscriber database/Authentication Center. The second gateway may also include a AAA server.

16 Claims, 4 Drawing Sheets

U.S. PATENT DOCUMENTS

| | | | |
|---|---|---|---|
| 6,167,513 A * | 12/2000 | Inoue et al. | 713/150 |
| 6,526,506 B1 * | 2/2003 | Lewis | 713/153 |
| 6,571,289 B1 * | 5/2003 | Montenegro | 709/227 |
| 6,760,444 B1 * | 7/2004 | Leung | 380/270 |
| 6,766,453 B1 * | 7/2004 | Nessett et al. | 713/171 |
| 6,795,857 B1 * | 9/2004 | Leung et al. | 709/224 |
| 6,839,338 B1 * | 1/2005 | Amara et al. | 370/338 |
| 6,915,345 B1 * | 7/2005 | Tummala et al. | 709/225 |
| 2001/0055394 A1 * | 12/2001 | Vanttinen et al. | 380/258 |
| 2002/0056001 A1 * | 5/2002 | Magee et al. | 709/225 |
| 2002/0080752 A1 * | 6/2002 | Johansson et al. | 370/338 |

OTHER PUBLICATIONS

"Network Access AAA Evaluation Criteria", By: Aboba, et al, Nov. 2000.

"AAA Solutions", By: Calhoun et al, Nov. 2000.

"Internet Security Association and Key Management Protocol (ISAKMP)", By: Maughan, et al, Nov. 1998.

"The Internet Key Exchange (IKE)", By Harking & Carrel, Nov. 1998.

* cited by examiner

EFFICIENT SECURITY ASSOCIATION ESTABLISHMENT NEGOTIATION TECHNIQUE

FIELD

The present invention relates to wireless terminals and more particularly to a technique for efficiently negotiating security associations establishment between a Mobile Node connected to the wireless terminal and different network entities.

BACKGROUND OF THE INVENTION

In wireless networks, such as cellular networks, Mobile Nodes such as cellular telephones must establish security associations with different network entities. Establishing a Security Association between a Mobile Node and a network entity means deciding a set of parameters describing the Security Association. In particular, it may mean deciding what security algorithms, such as encryption, integrity protection, authentication and key derivation algorithms, are to be used for communications over the wireless interface. It may also mean deciding how these algorithms are to be used and in what cases, what keys are to be used with the algorithms, how additional keys to be used in the Security Association are to be derived, the lifetime of the Security Association and of the keys established in the Security Association.

For example, in future cellular networks, the Mobile Node will have to dynamically establish security associations with various different network entities.

The following describes a list of security associations that a Mobile Node may need to establish with an entity; but this list is provided to illustrate the current application. This latter is not restricted to the following scenarios.

The Mobile Node and the serving system must agree on the aspects of a Security Association mentioned above for communications over the wireless interface with a network entity.

If the network is a mobile IPv4 (Internet Protocol) based cellular network, the Mobile Node and the Foreign Agent may have to establish a Security Association.

If the network is a mobile IP (Internet Protocol) based cellular network, and the Home Agent is dynamically assigned, then the Mobile Node and the assigned Home Agent must set up a Security Association. Furthermore, if the network is a mobile IP based cellular network, then the Mobile Node and the Corresponding Node may also have to set up such a Security Association in order to use Route Optimizations.

If a Localized Mobility Management scheme such as MIPv6RR (Mobile lpv6 Regional Registration) or HMIPv6 (Hierarchical Mobile lpv6) is used, the Mobile Node and the Agents in the visited domain must share a Security Association. Thus, as noted above, there are many cases in which the Mobile Node needs to set up a Security Association with one or more Network Entities in the visited domain. In order to setup such a Security Association, the Mobile Node needs to indicate to the Network Entities the list of parameters describing the Security Association mentioned above that it supports.

The messages sent by the Mobile Node containing the above noted information can be long since the Mobile Node must define the capabilities it supports and must send some specific proposals to the Network Entities. The Mobile Node and the Network Entities may sometimes exchange many messages before agreeing on specific parameters of the Security Association as described above. Accordingly, the negotiations needed to set up the Security Associations are extensive and therefore not efficient for cellular networks or other wireless networks where the radio resources are limited and expensive.

SUMMARY OF THE INVENTION

In the efficient security association establishment negotiation technique of the present invention, negotiations over the wireless link between the Mobile Node and a Network Entity are avoided to conserve limited radio resources. This is achieved by having a negotiation between such a Network Entity and a network element in the home domain/network acting as a proxy on behalf of the Mobile Node in the establishment of a Security Association between the Mobile Node and a Network Entity.

A security association establishment negotiation technique in accordance with the present invention includes forwarding identifying information from a Mobile Node via a first interface to a first network element. Negotiations are then initiated between the first network element and a second network element acting as a proxy for the Mobile Node via a second interface to establish a security association between the Mobile Node and the first network element, the second network element utilizing previously stored Security Association parameters and preferences of the Mobile Node. Upon agreement between the first network element and the second network element with regard to the Security Association parameters, the first network element forwards the agreed-upon Security Association parameters to the Mobile Node via the first interface.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. This spirit and scope of the present invention are limited only by the terms of the appended claims.

The following represents brief descriptions of the drawings, wherein.

DETAILED DESCRIPTION

Figure 1:
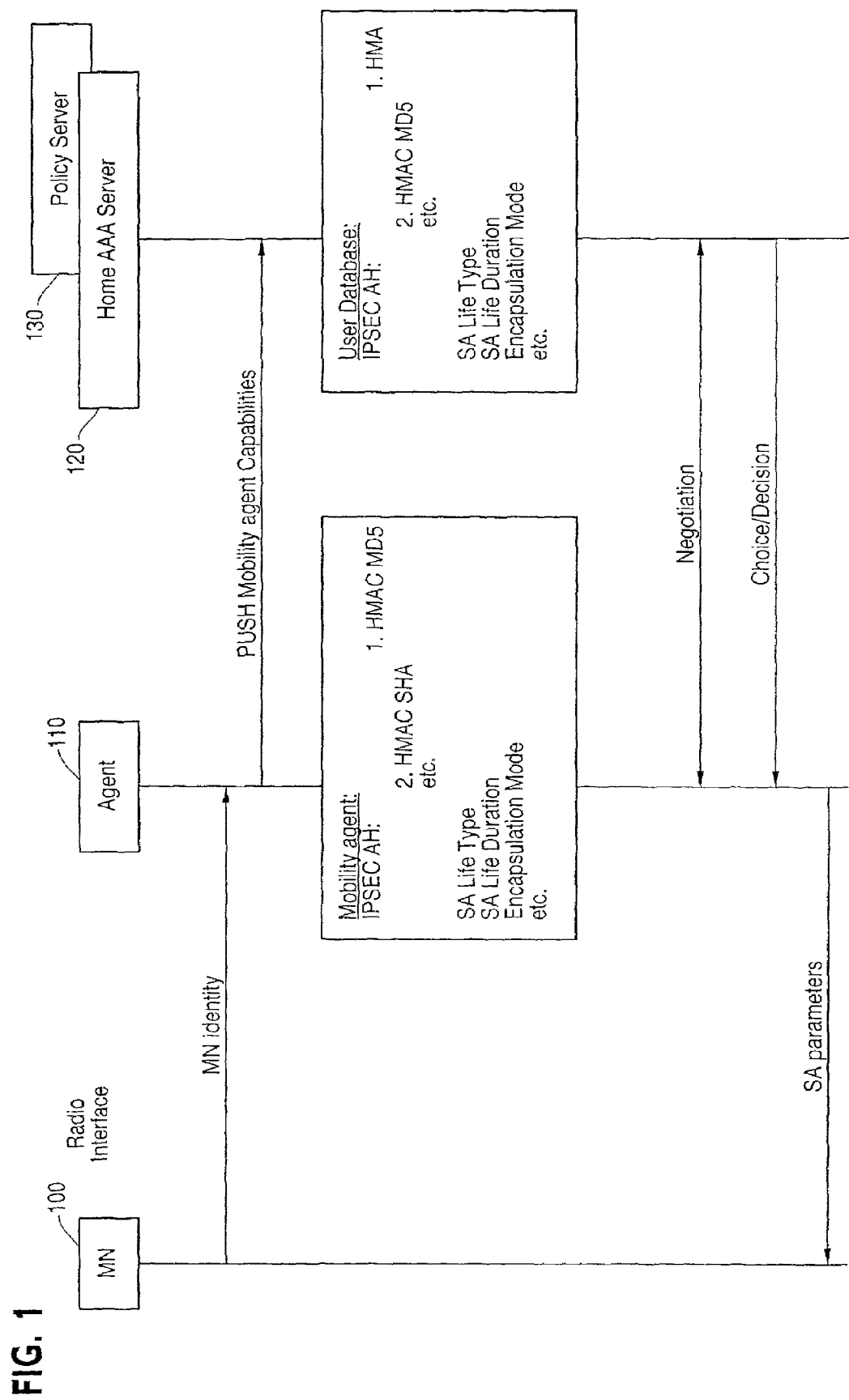
FIG. 1 illustrates an example of a Security Association establishment between a Mobile Node and an Agent in accordance with the present invention.

Before beginning a detailed description of the subject invention, mention of the following is in order. When appropriate, like reference numerals and characters may be used to designate identical, corresponding, or similar components in differing drawing figures. Further, in the detailed description to follow, example sizes/models/values/ranges may be given, although the present invention is not limited thereto. Lastly, the details of various elements which are defined by currently used industry standards have not been included for simplicity of illustration and discussion as so as not to obscure the invention. However, where known, these standards will be cited in the specification and are incorporated by reference herein in their entirety.

FIG. 1 illustrates an example of a Security Association establishment between a Mobile Node and an Agent in accordance with a present invention. The following text contains a list of scenarios to identify different types of agents. The list is not exhaustive and the current application is not to be considered restricted to the following scenarios. As an example, if a security association is required to protect data over the access link between the Mobile Node and the Access Router, the Agent can be the Access Router. In the same way, if the network is a Mobile IP (Internet Protocol) based cellular network, and the Mobile IP Home Agent is dynamically assigned for the Mobile Node, the Agent can be the Home Agent. If the network is in particular a Mobile IPv4 based cellular network, the Agent can be the Foreign agent. Again, if the network is a Mobile IP based cellular network, then the Mobile Node and the Corresponding Node may also have to set up a Security Association in order to implement Mobile IP mechanisms such as route optimizations. Finally, if a Localized Mobility Management scheme such as MIPv6RR or HMIPv6 is used, the Mobile Node and the Agents in the visited domain must share a Security Association.

In FIG. 1, a Mobile Node 100 shares knowledge of the parameters describing the Security Associations supported by the Mobile Node and the Mobile Node preferences regarding selection of the Security Association parameters with one or more entities in its home domain, in this case a Home AAA (Authentication, Authorization, and Accounting) Server 120 and/or a Policy Server 130.

The parameters describing the Security Associations types that the Mobile Node supports and that are shared by the Mobile Node 100 and the Home AAA Server 120 and/or Policy Server 130 may include but are not limited to: what security algorithms, such as encryption, integrity protection, authentication and key derivation algorithms, are to be used for communications over the wireless interface; how these algorithms are to be used and in what cases; what keys are to be used with the algorithms; how additional keys to be used in the Security Association are to be derived; the lifetime of the Security Association and of the keys established in the Security Association.

As noted in FIG. 1, a Mobile Node 100 sends its identity and indications of the Security Associations it needs to establish with a network entity via a connection that may include a wireless link to an Agent 110. The network entity, in this case the Agent 110, then contacts an entity in the Mobile Node's home domain, in this case a Home AAA (Authentication, Authorization, and Accounting) Server 120. The Agent 110 sends the identity of the Mobile Node and, optionally, its own security policies and capabilities to the Home AM Server 120. That is, the Agent 110 informs the Server 120 that a security association between the agent and the Mobile Node identified by the identity is requested The Agent 110 may also send to the Server 120 a list of proposals of parameters of the Security Associations it prefers to use with the Mobile Node 100.

Thus, rather than the Mobile Node 100 conducting the negotiations needed for the establishment of the required Security Associations with the Agent 110, the Agent 110 conducts negotiations with the Server 120. In the home domain of the Mobile Node 110, the capabilities of the Mobility Agent 110 are compared with those of the Mobile Node 100 by the Server 120 or by the Server 130. The Server 120 or the Server 130 acts as a proxy for the Mobile Node by conducting the negotiations with the Agent 110 and making a decision on the parameters of the Security Association according to the Mobile Node preferences. Several messages may be exchanged between the Mobility Agent 110 and the Server 120 or Server 130 prior to the final decision.

The Agent 110 then passes the choice/decision of the Server 120, that is, the parameters describing the selected Security Association, to the Mobile Node 100.

Note that the details of the various parameters transferred during negotiations between the Agent 110 and the Server 120 have not been discussed in detail since they are clearly defined in various industry groups standards. For example, the IETF (Internet Engineering Task Force), which publishes numerous industry standards on its Internet site at www.i-etf.org, has published Internet Security Association and Key Management Protocol (rfc 2408) and the Internet Key Exchange (rfc 2409) which are relevant to the above noted negotiations. They have also published numerous AAA standards, such as AAA Solutions, Criteria for Evaluating an AAA Protocols for Network Access, and Authentication, Authorization, and Accounting: Protocol Evaluation. All of these standards are incorporated herein by reference in their entirety.

Furthermore, while present day cellular networks authenticate a user based on symmetric key mechanisms, future cellular networks will also have the option to use Public Key authentication mechanisms and for the key distribution, many mechanisms, such as the Diffie Hellman procedure, will become possible. Accordingly, in accordance with the technique of the present invention, after the Mobile Node sends its identity to the network entity, such as the Agent, the Agent can communicate with the home domain, that is, the Home AAA Server, and learn from the Home AAA Server what parameters describing a Security Association the Mobile Node supports. Thus, the technique in accordance with the present invention offers is the possibility of many types of Security Associations.

Figure 2:
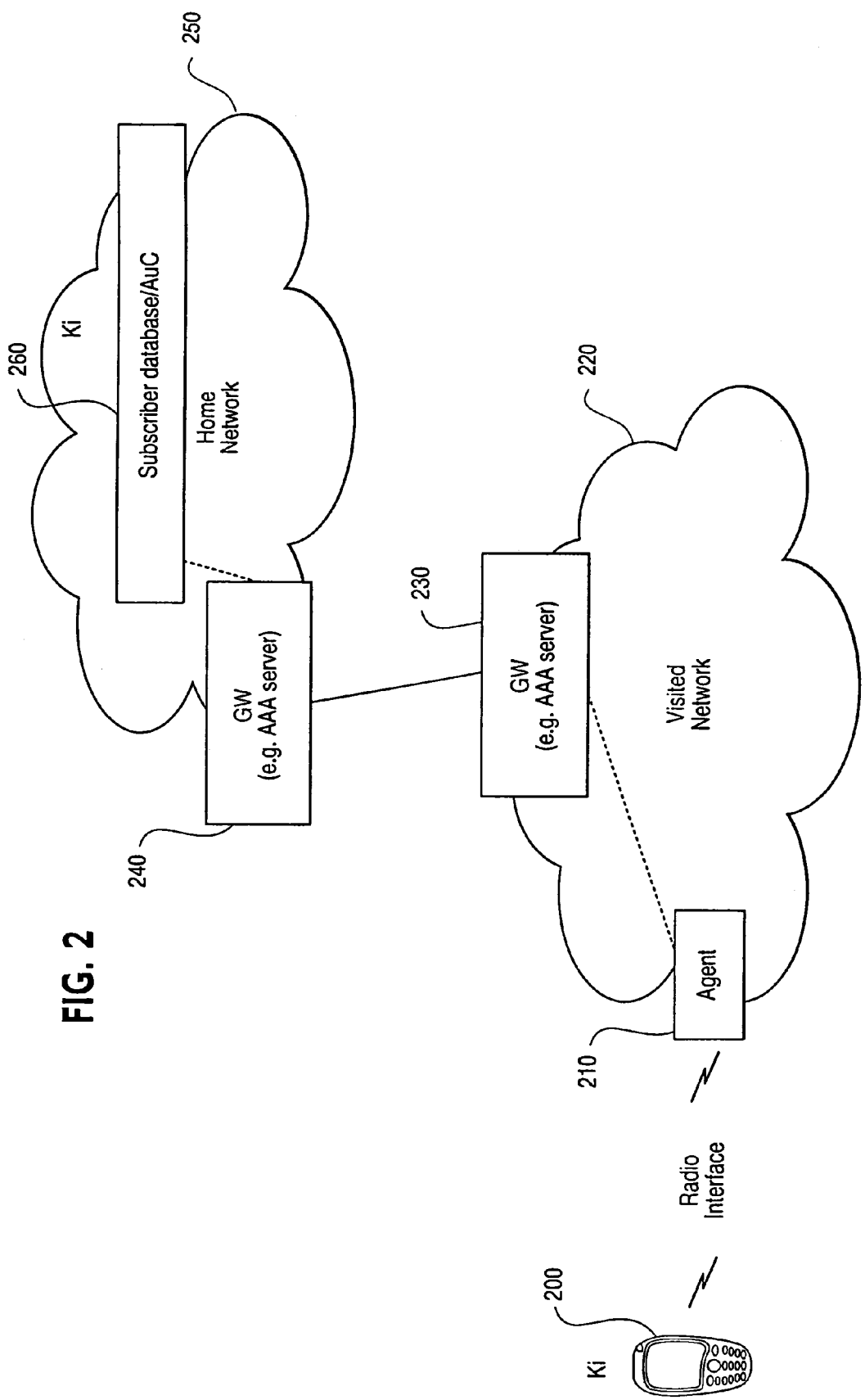
FIG. 2 illustrates an example of an environment in which the technique in accordance with the present invention may be used.

FIG. 2 illustrates an example of an environment in which the technique in accordance with the present invention may be used. As illustrated in FIG. 2, a mobile terminal (Mobile Node) 200 is connected via a wireless interface to an Agent 210 of a Visited Network 220 which is connected to a Visited Gateway (GW) 230 connected to a Home Gateway 240 of a Home Network 250. A Subscriber database/Authentication Center 260 is disposed within the Home Network 250 and is connected to the Home GW 240.

It is assumed that there is a pre-established Security Association between the Visited GW 230, which can be the Visited AAA Server, and the Agent 210. This Security Association may, for example, be set up offline through manual key entry, Internet Key Exchange Protocol or a Key Distribution Server specific to the Visited Network 220. This provides security internally to the network so that the operator can choose the level and type of security to be implemented in its network.

Similarly, there is another pre-established Security Association between the Subscriber database/Authentication Center 260 and the Home GW 240. This Security Association may be established in the same fashion as that noted above and also serves to provide security internally to the network.

Furthermore, there is still another pre-established Security Association between the Home GW 240 and the Visited GW 230. This Security Association may be established offline through a roaming agreement or via an automatic protocol according to industry standards.

The Mobile Node 200 and the Subscriber database/Authentication Center 260 may share a long-term key Ki, common knowledge of a security function F1 for derivation of an integrity key, common knowledge of a security function F2 for derivation of a ciphering key, and common knowledge of a MAC function for integrity protection of data. Other keys and knowledge of algorithms may be shared by the Mobile Node 200 and the Subscriber database/Authentication Center 260.

Figure 3:
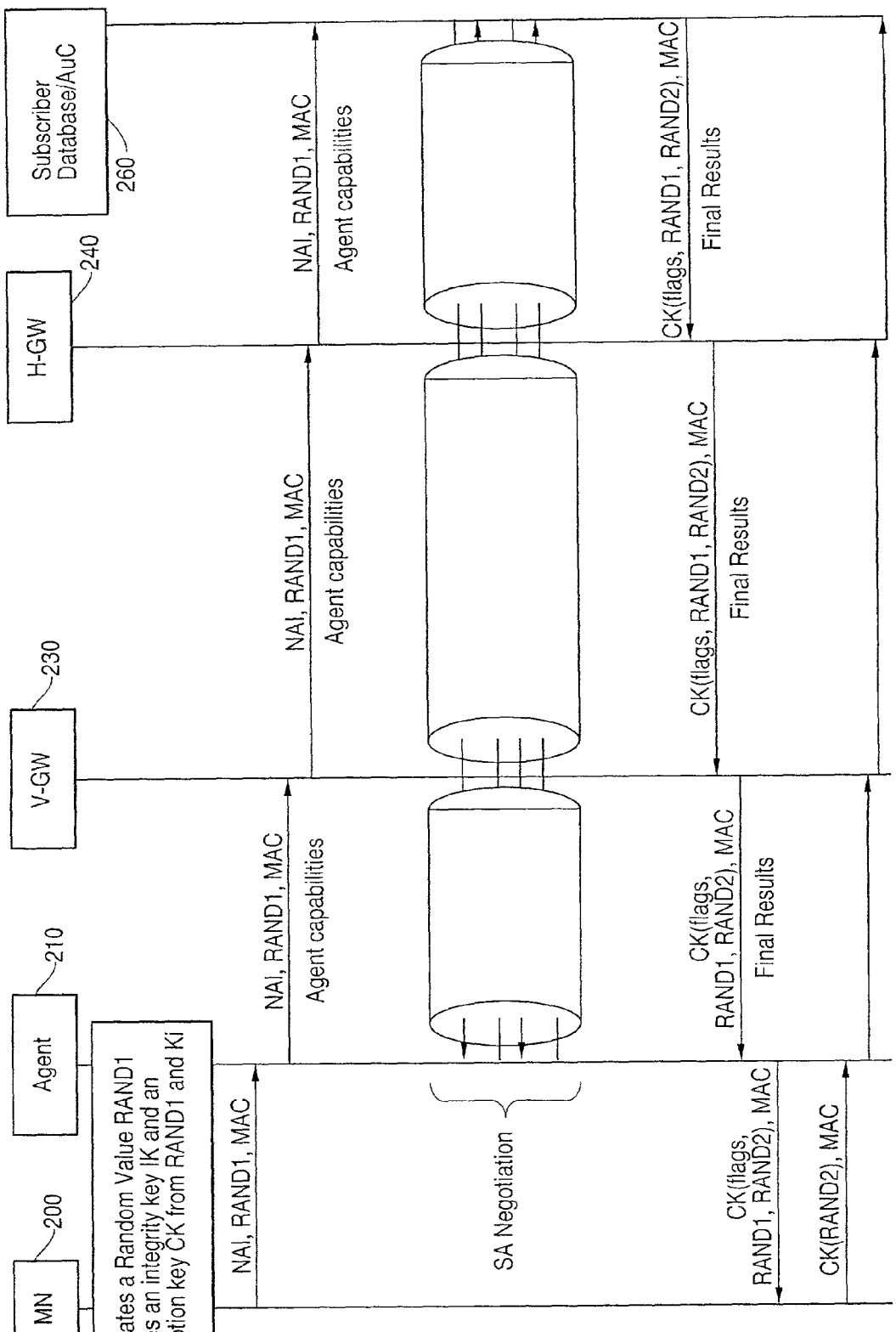
FIG. 3 illustrates an example of a negotiation to establish a Security Association in accordance with the present invention.

FIG. 3 illustrates an example of a negotiation to establish a Security Association in accordance with the present invention in the environment of FIG. 2. Referring to FIG. 3, the Mobile Node 200 generates a random value, RAND1 and uses it as an input with the key Ki for two different functions F1 and F2 and shares it with its Home Network 250 to derive a temporal integrity key IK and a temporal ciphering key CK. That is, F1 (Ki, RAND1)=IK and F2 (Ki, RAND2) =CK. The Mobile Node 200 sends its identity through its NAI, for example, to the Agent 210 with the RAND1 and a MAC for integrity protection using the IK. The Mobile Node 200 may also protect part of the message using CK encrypt it.

Since the message is a request for a Security Association to be set up between the Agent 210 and the Mobile Node 200 which belongs to another network, the Agent 210 forwards the message to the Visited GW 230 and may include the parameters describing the Security Associations that the Agent 230 supports. In addition, the Agent 230 may also include in the message a list of proposals of parameters of the Security Associations it prefers to use with the Mobile Node 200.

The Agent 210 can determine that the Mobile Node 200 belongs to another network by analyzing the realm part of the NAI, for example. This message is secured due to the Security Association between the Agent 210 and the Visited GW 230.

The Visited GW 230 then transmits this request to the Home GW 240 of the Mobile Node 200 due to the realm part of the NAI, for example, and this message is protected by the Security Association established between the Visited GW 230 and the Home GW 240.

The Home GW 240 then forwards the message to the Subscriber database/Authentication Center 260. The message is protected using the appropriate Security Association established therebetween.

The Subscriber database/Authentication Center 260 then retrieves the Ki based on the NAI and using the RAND1, derives CK and IK. It then verifies the correctness of the MAC using IK and if it succeeds, the Subscriber database/Authentication Center 260, on behalf of the Mobile Node 200, starts the negotiations of the different parameters of a Security Association with the Agent 210. These message exchanges are protected due to the various established Security Associations between the Agent 210 and the Visited GW 230 and between the Visited GW 230 and the Home GW 240, etc.

The Subscriber database/Authentication Center 260 will determine, from a database, which Security Association parameters are to be used, based on the parameters for Security Associations that the Mobile Node 200 supports.

Note that there may be several round-trip message exchanges in the negotiation, which may occur before there it is agreement with respect to all of the different parameters. Any agreed-upon industry standard protocol may be used for the Security Association.

Once the Subscriber database/Authentication Center 260 and the Agent 210 have agreed on the different parameters describing the Security Association to be used with the Mobile Node 200, the Subscriber database/Authentication Center 260 will send the parameters to the Agent 210 utilizing the previously established Security Associations to protect and authenticate them and will also inform the Mobile Node 200 using CK and IK to secure the parameters. The Mobile Node 200 and its Home GW 240 can use flags or some data fields to carry data. However, no standardization thereof may be required since the data is being sent from the Mobile Node 200 to its Home GW 240. The Subscriber database/Authentication Center 260 may also generate another random value RAND2 and send it to the Mobile Node 200 using the random value RAND1.

The Mobile Node 200 may use both CK and IK to decrypt/authenticate the message received from its Home GW 240 and set up the Security Association according to the contents of the message.

Figure 4:
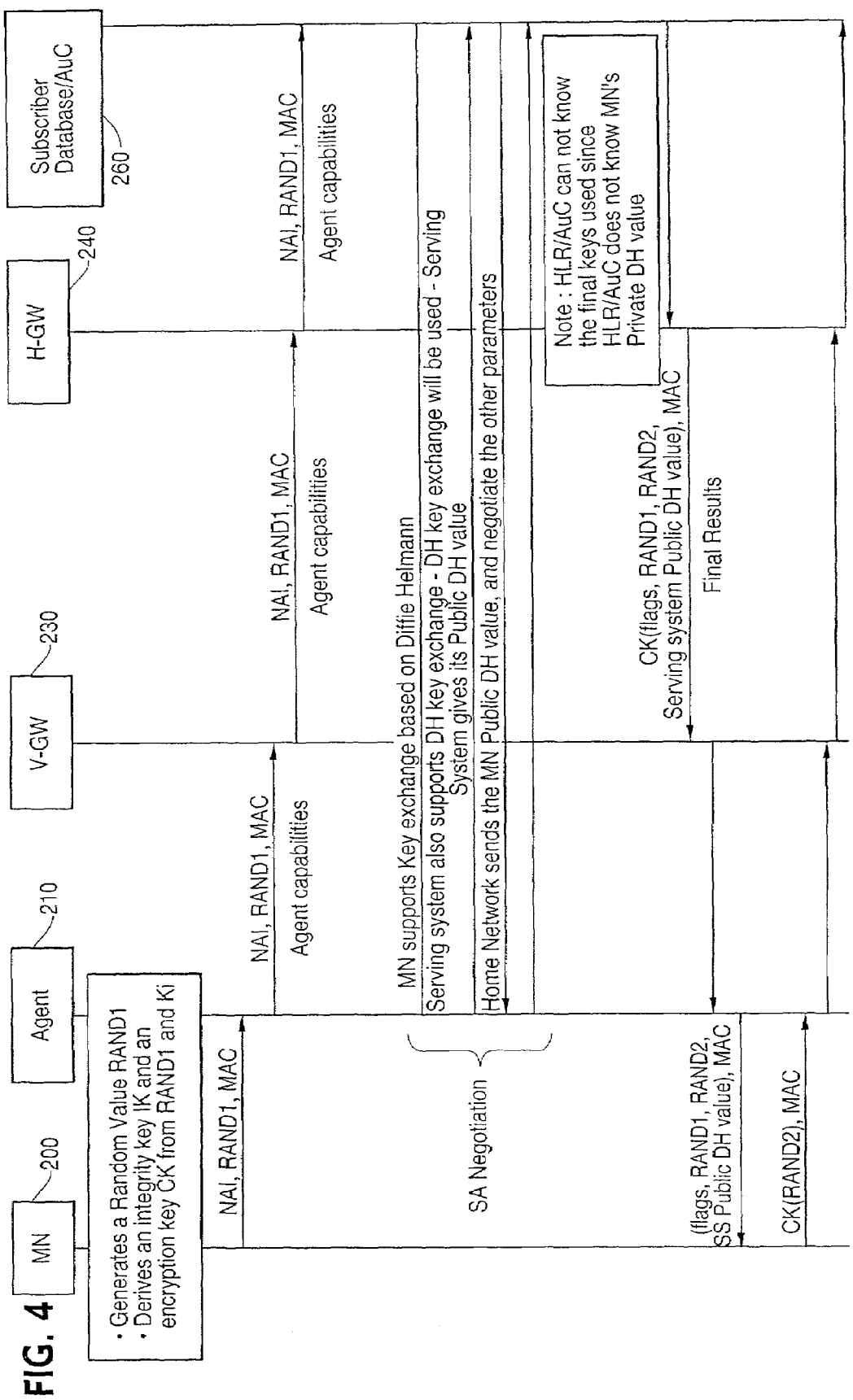
FIG. 4 illustrates another example of a negotiation to establish a Security Association in accordance with the present invention.

FIG. 4 illustrates another example of a negotiation to establish a Security Association in accordance with the present invention. In the example shown in FIG. 3, the Subscriber Database and Authentication Server 260 is aware of the keys used by the Mobile Node 200, which may not be acceptable in certain cases. That is, the Mobile Node 200 may not want anyone other than the entity that it is communicating with to know the keys that are being used. As shown in FIG. 4, it is possible for the Server 220 or the Server 230 acting as a proxy on behalf of the Mobile Node 200 to negotiate the value of the parameters of the Security Association to be used between the Mobile Node 200 and the Agent 210 without the Server 220 or the Server 230 knowing the value of the keys. For example, after the Agent 210 provides during the negotiation its Diffie Hellman public value to the Server 220 or the Server 230, the latter may send the public Diffie Hellman value of the Agent 210 to the Mobile Node 200.Since the Server 220 or the Server 230 does not know the Mobile Node 200 private Diffie Hellman value, it cannot determine the final value of the parameters of the Security Association. That is, the Home Network 250 is used to negotiate the different parameters of the Security Association and exchange the Diffie Hellman value in an authenticated fashion but since the Server 220 or the Server 230 does not know the Mobile Node's private value, it cannot derive the final keys.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of this invention. In addition to variations and modifications in the component parts and/or arrangements, alternative uses will also be apparent to those skilled in the art.

What is claimed is:

1. A security association establishment negotiation method comprising:
   forwarding identifying information and a request for a security association from a mobile node via a first interface to a first network element;
   forwarding the identifying information and the request for a security association from the first network element to a second network element via a second interface;
   performing negotiations between the first network element and the second network element via the second interface to establish a security association between the mobile node and the first network element, the second network element utilizing previously stored security association parameters of the mobile node; and
   upon agreement between the first network element and the second network element with regard to the security association parameters, the first network element forwarding the agreed-upon security association parameters negotiated between the first network element and the second network element to the mobile node via the first interface.

2. The method of claim 1, wherein performing negotiations between the first network element and the second network element via the second interface includes exchanging parameters for the establishment of the security association.

3. The method of claim 2, wherein the first interface comprises a wireless interface to forward information between the mobile node and the first network element.

4. The method of claim 2, wherein the first network element is connected to a first gateway.

5. The method of claim 4, wherein the first gateway comprises an authentication, authorization, and accounting (AAA) server.

6. The method of claim 1, wherein the second network element comprises a subscriber database and an authentication center.

7. The method of claim 6, wherein the second network element further comprises a second gateway connected to the subscriber database and authentication center.

8. The method of claim 7, wherein the second gateway comprises an authentication, authorization, and accounting (AAA) server.

9. A security association establishment negotiation apparatus for a mobile node, the apparatus comprising:
   a first interface connected to a first network element to forward identifying information and the request for a security association from the mobile node to the first network element; and
   a second interface connected between the first network element and a second network element, configured to forward the identifying information and the request for a security association from the first network element to the second network element, the first network element performing negotiations between the first network element and the second network element to establish a security association between the mobile node and the first network element utilizing security association parameters of the mobile node previously stored in the second network element;
   wherein, upon agreement between the first network element and the second network element with regard to the security association parameters, the first network element forwarding the agreed-upon security association parameters negotiated between the first network element and the second network element to the mobile node via the first interface.

10. The apparatus of claim 9, wherein performing negotiations between the first network element and the second network element via the second interface includes exchanging parameters for the establishment of the security association.

11. The apparatus of claim 10, wherein the first interface comprises a wireless interface to forward information between the mobile node and the first network element.

12. The apparatus of claim 11, wherein the first network element is connected to a first gateway.

13. The apparatus of claim 12, wherein the first gateway comprises an authentication, authorization, and accounting (AAA) server.

14. The apparatus of claim 10, wherein the second network element comprises a subscriber database and an authentication center.

15. The apparatus of claim 14, wherein the second network element further comprises a second gateway connected to the subscriber database and authentication center.

16. The apparatus of claim 15, wherein the second gateway comprises an authentication, authorization, and accounting (AAA) server.

* * * * *